United States Patent
Walters et al.

(10) Patent No.: US 11,823,199 B2
(45) Date of Patent: Nov. 21, 2023

(54) SYSTEM, METHOD AND COMPUTER-ACCESSIBLE MEDIUM FOR FRAUD DETECTION BASED ON SATELLITE RELAYS

(71) Applicant: Capital One Services, LLC, McLean, VA (US)

(72) Inventors: Austin Walters, Savoy, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 178 days.

(21) Appl. No.: 16/861,587

(22) Filed: Apr. 29, 2020

(65) Prior Publication Data

US 2021/0342845 A1 Nov. 4, 2021

(51) Int. Cl.
| | |
|---|---|
| *G06Q 20/40* | (2012.01) |
| *G06F 16/29* | (2019.01) |
| *H04W 24/10* | (2009.01) |
| *G06F 16/23* | (2019.01) |
| *H04W 84/06* | (2009.01) |

(52) U.S. Cl.
CPC ..... *G06Q 20/4016* (2013.01); *G06F 16/2379* (2019.01); *G06F 16/29* (2019.01); *H04W 24/10* (2013.01); *H04W 84/06* (2013.01)

(58) Field of Classification Search
None
See application file for complete search history.

(56) References Cited

U.S. PATENT DOCUMENTS

| | | |
|---|---|---|
| 6,314,296 B1 | 11/2001 | Hamada et al. |
| RE38,899 E | 11/2005 | Fischer |
| 7,539,500 B2 | 5/2009 | Chiang |
| 7,574,606 B1 | 8/2009 | Fan et al. |
| 9,439,164 B2 | 9/2016 | Stewart et al. |
| 9,460,429 B2 | 10/2016 | Du |
| 9,491,786 B1 | 11/2016 | Petkus et al. |
| 9,535,160 B2 | 1/2017 | Bardout |
| 2001/0011352 A1 | 8/2001 | O'Mahony |
| 2002/0017977 A1 | 2/2002 | Wall |
| 2003/0069692 A1 | 4/2003 | Krasner et al. |
| 2005/0024201 A1 | 2/2005 | Culpepper et al. |

(Continued)

*Primary Examiner* — Gregory S Cunningham, II
(74) *Attorney, Agent, or Firm* — HUNTON ANDREWS KURTH LLP

(57) ABSTRACT

An exemplary system, method, and computer-accessible medium can include receiving first information related to a first transaction associated with a financial account, determining a first network coverage area associated with the first transaction, receiving second information related to a second transaction associated with the financial account, determining a second network coverage area associated with the second transaction, flagging the second transaction as potentially fraudulent based on the first network coverage area and the second network coverage area. The financial account can be a credit card account. The second transaction can be flagged if the first network coverage area and the second network coverage area do not overlap. The first network coverage area can be based on a coverage area for a first satellite and the second network coverage area can be based on the coverage area for a second satellite, where the first satellite can be different than the second satellite.

20 Claims, 7 Drawing Sheets

(56) References Cited

U.S. PATENT DOCUMENTS

| | | |
|---|---|---|
| 2005/0159890 A1 | 7/2005 | Humphries et al. |
| 2009/0021425 A1 | 1/2009 | Cameron et al. |
| 2009/0082040 A1 | 3/2009 | Kahn |
| 2011/0096913 A1 | 4/2011 | Mahalingam |
| 2011/0202466 A1* | 8/2011 | Carter .................... G06Q 20/32 |
| | | 705/67 |
| 2011/0256845 A1 | 10/2011 | Shuster |
| 2012/0303353 A1 | 11/2012 | Souluer |
| 2013/0254227 A1 | 9/2013 | Shim et al. |
| 2013/0328719 A1 | 12/2013 | Gum et al. |
| 2014/0225769 A1 | 8/2014 | Akcasu et al. |
| 2015/0100394 A1 | 4/2015 | Povolny et al. |
| 2017/0255789 A1 | 9/2017 | Falk |
| 2017/0276762 A1* | 9/2017 | Pama .................... G06F 16/487 |
| 2017/0356996 A1 | 12/2017 | Lee |
| 2018/0103019 A1* | 4/2018 | Chen .................... H04L 63/0492 |
| 2018/0121913 A1* | 5/2018 | Unnerstall ........... G06Q 20/405 |
| 2018/0365665 A1* | 12/2018 | Yan ....................... H04W 4/029 |
| 2020/0186997 A1* | 6/2020 | Smith .................... H04L 67/04 |

\* cited by examiner

SYSTEM, METHOD AND COMPUTER-ACCESSIBLE MEDIUM FOR FRAUD DETECTION BASED ON SATELLITE RELAYS

FIELD OF THE DISCLOSURE

The present disclosure relates generally to fraud detection, and more specifically, to exemplary embodiments of an exemplary system, method, and computer-accessible medium for fraud detection based on satellite relays.

BACKGROUND INFORMATION

It is estimated that there are approximately 2,000 communication satellites that currently orbit the earth. However, of the thousands of communication satellites, only a small percentage of them are used commercially for data networks. Presently, global communication systems, over satellites, are being developed that will allow a connection to the internet anywhere in the world. Each of these satellites however, may be limited to networking satellites only, and may not provide global positioning system ("GPS") information. Thus, certain fraud measures that are currently in place may not be effective with future satellite networks.

In a typical Point of Sale ("POS") device transaction over a satellite, the POS device will connect to the closest satellite and attempt to receive a response from the satellite in order to complete a transaction (e.g., a credit card transaction). However, a communication satellite does not provide geolocation information, and thus no information about the location of the POS device is generally used for fraud detection.

Thus, it may be beneficial to provide an exemplary system, method and computer-accessible medium for fraud detection based on satellite relays which can overcome at least some of the deficiencies described herein above.

SUMMARY OF EXEMPLARY EMBODIMENTS

An exemplary system, method, and computer-accessible medium can include receiving first information related to a first transaction associated with a financial account, where the first information includes a first date and a first time associated with the first transaction, determining a first network coverage area associated with the first transaction, receiving second information related to a second transaction associated with the financial account, where the second information includes a second date and a second time associated with the second transaction, determining a second network coverage area associated with the second transaction, flagging the second transaction as potentially fraudulent based on the first network coverage area and the second network coverage area. The financial account can be a credit card account or a line of credit. The second transaction can be flagged if the first network coverage area and the second network coverage area do not overlap. The first network coverage area can be based on a coverage area for a first satellite and the second network coverage area can be based on the coverage area for a second satellite, where the first satellite can be different than the second satellite.

In certain exemplary embodiments of the present disclosure, the first satellite and the second can be tracked using a geolocation of the first satellite and the second satellite. A time series database(s) can be generated based on the tracking of the first satellite and the second satellite. The geolocation of the first satellite and the second satellite can be used to generate a time series based on a particular time interval.

In some exemplary embodiments of the present disclosure, the second transaction can be flagged based on an elapsed time between the first transaction and the second transaction. A first geographic location associated with the first network coverage area and a second geographic location associated with the second network coverage area can be determined. A distance between the first geographic location and the second geographic location can be determined. The second transaction can be flagged based on the distance. The second transaction can be flagged based on a likelihood of a person travelling the distance in the elapsed amount of time. The likelihood can be based on a method of travel. The method of travel can include (i) air travel, (ii) car travel, (iii) train travel, or (iv) bike travel. A map database(s) can be accessed, a route between the first geographic location and the second geographic location can be mapped, and the distance can be determined based on the route.

Additionally, an exemplary system, method, and computer accessible medium can include receiving first information related to a plurality of satellites, where the second information includes a first date and a first time associated with the first transaction, determining a geographic area associated with a network coverage area for each of the satellites, receiving second information related to a first transaction associated with a financial account, determining a first geographic area for the first transaction based on the network coverage area of a first one of the satellites through which the first transaction took place and the second information, receiving third information related to a second transaction associated with the financial account, where the third information includes a second date and a second time associated with the second transaction, determining a second geographic area for the second transaction based on the network coverage area of a second one of the satellites through which the second transaction took place and the third information, and flagging the second transaction as potentially fraudulent based on the first geographic area and the second geographic area.

In certain exemplary embodiments of the present disclosure, the first satellite and the second can be tracked using a geolocation of the first satellite and the second satellite. The financial account can be a credit card account. The second transaction can be flagged if the first geographic area and the second geographic coverage area do not overlap. The second transaction can be flagged based on an elapsed time between the first transaction and the second transaction. A distance between the first geographic area and the second geographic area can be determined. The second transaction can be flagged based on a likelihood of a person travelling the distance in the elapsed amount of time. The likelihood can be based on a method of travel. The method of travel can include (i) air travel, (ii) car travel, (iii) train travel, or (iv) bike travel. A map database(s) can be accessed, a route between the first geographic location and the second geographic location can be mapped, and the distance can be determined based on the route.

Further, an exemplary system, method, and computer-accessible medium can include, receiving first information related to a first transaction associated with a financial account, determining a first geographic area associated with the first transaction based on a first network coverage area associated with a first satellite through which the first transaction took place, receiving second information related to a second transaction associated with the financial account, determining a second geographic area associated with the second transaction based on a second network coverage area associated with a second satellite through which the second transaction took place, wherein the first satellite is different than the second satellite, determining (i) an elapsed time between the first transaction and a the second transaction and (ii) a distance between the first geographic area and the second geographic area, determining a likelihood of a person travelling the distance in the elapsed amount of time, and flagging the second transaction as potentially fraudulent based on the likelihood.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Figure 1:
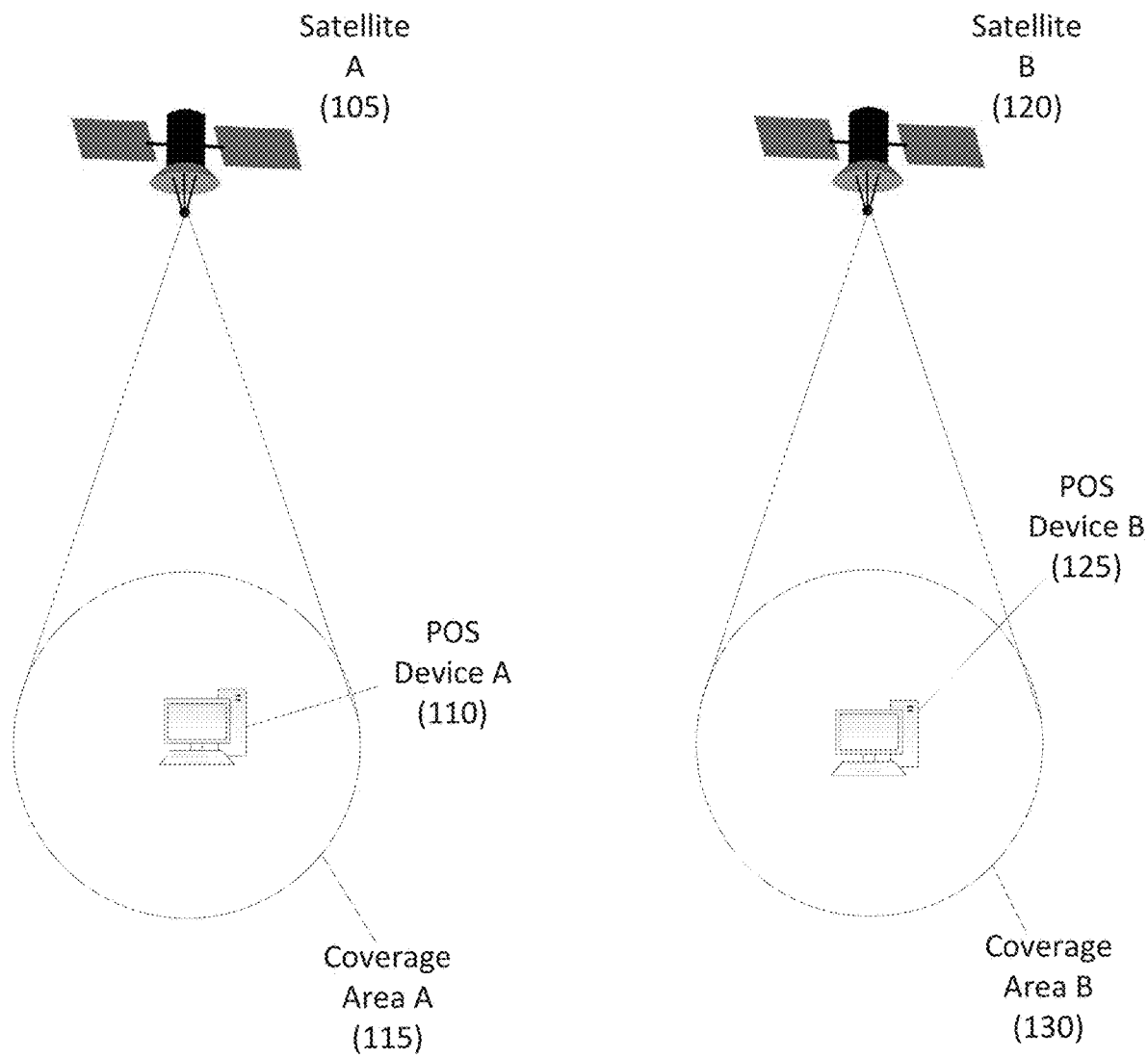
FIG. 1 is an exemplary diagram illustrating different transactions initiated over different satellites according to an exemplary embodiment of the present disclosure.

With the rampant increase in fraudulent transactions, many prior fraud detections procedures can be ineffective when the method of communication is satellite based. However, the exemplary system, method and computer-accessible medium can utilize connection information with one or more satellites to determine if certain transactions are fraudulent or not. For example a POS device can transmit the transaction information to its closest satellite, which can include the financial account (e.g., credit card) associated with the transaction, and the transaction amount. The financial institution associated with the financial account can compare the satellite used for this transaction to other satellites that were previously used for other transactions associated with the financial account. Various information about the satellites (e.g., geolocation, orbiting patterns, geographic coverage areas, speed, etc.) can be analyzed and compared. Based on the information from the satellite used for the current transaction, and the one or more satellites used for previous transactions, the exemplary system, method and computer-accessible medium can determine if a transaction is fraudulent, or the information can be aid in the determination of a fraudulent transaction.

For example, the exemplary system, method and computer-accessible medium can determine whether or not the POS used for the transaction is in a different location, or whether the location of the transaction is sufficiently different from a previous transaction to determine if a transaction is fraudulent. Thus, the exact Geo-coordinates of a POS device are not needed in order to determine if a transaction is fraudulent. By analyzing information about all or a subset of the communication satellites, the exemplary system, method and computer-accessible medium can maintain the approximate location of each satellite, including its geographic coverage area. Any transaction information received can be traced to a particular geographic coverage area depending on which satellite the transactions is transmitted over. A comparison of the geographic coverage areas of different transactions for the same financial account can provide information used to detect a fraudulent transaction. For example, the exemplary system, method and computer-accessible medium can analyze the satellite location of more than one transaction, and flag a transaction as fraudulent if the transactions occur in different geographic coverage areas where it would not be feasible for the owner of the financial account to have moved between the geographic coverage areas in the amount of time between the transactions. As will be discussed herein, the exemplary system, method and computer-accessible medium can use various information in order to determine if a transaction is fraudulent.

In order to use satellite information to determine fraudulent transactions, the exemplary system, method and computer-accessible medium can store information about the satellites for future analysis. For example, the current location for each satellite can be stored, as well as the historical information for the satellite, for a predetermined amount of time. The amount of time for the history can be for the last day, week, month, year, or multiple years. Specific time points can be stored for each satellite at various intervals. For example, if the previous month is being stored for each satellite, then the history can include the location every hour in that month. The interval can be based on the speed of the satellite, and the change in location over each interval. For example, a short interval may not be beneficial, as the location of the satellite may not change significantly over a short period of time. However, a long interval may also not be beneficial as the location of the satellite may change too significantly.

A time series database can be utilized, where the geo location of each satellite can be tracked. The sampling interval for tracking each satellite can be based on the rate of change of the satellite. The rate of change can be calculated once a new satellite starts to be tracked. Additionally, the sampling interval can be updated at various points in time (e.g., every day, every week, every month, every year, etc.). When a new satellite is tracked, information pertaining to its current location, direction of travel, and speed of travel can be determined, which can be used to determine various information pertaining to the satellite. Satellite information can also be updated when a change in the velocity of the satellite is detected.

When a transaction is received, the exact date, time, and satellite used for the transaction can be compared to the exact date time, and satellite information for one or more prior transactions. The satellite information can be obtained from the stored history for each satellite. For example, each stored transaction can include the exact date, time, and satellite used to transmit the transaction information. When the current transaction is compared to a previous transaction, the exemplary system, method and computer-accessible medium can obtain the prior transaction information from a transaction database. The transaction information will have the specific satellite associated with the transaction. The exemplary system, method and computer-accessible medium, according to an exemplary embodiment of the present disclosure, can obtain the history of the satellite from another database, and determine geolocation information, and/or geographic coverage area, for that satellite for the exact date and time of the transaction. This information can then be used to determine if the current transaction is fraudulent by analyzing the position or geographic coverage area of the satellites.

As discussed above, the geolocation of the satellite associated with a transaction can be used to determine if a transaction is fraudulent. For example, FIG. 1 is an exemplary diagram illustrating different transactions initiated over different satellites according to an exemplary embodiment of the present disclosure. As shown in FIG. 1, POS Device A (110) can initiate Transaction A on Date A, at Time A, utilizing Satellite A (105). POS Device A (110) is located in coverage area A (115). POS Device B (125) can initiate Transaction B on Date B, at Time B, utilizing Satellite B (120). POS Device B (125) is located in coverage area B (130). Transaction A, and the information related thereto, can be compared to Transaction B and its relevant information. For example, the exemplary system, method and computer-accessible medium can compare the location and/or coverage area A (115) to the location and/or coverage area B (130) of Satellite A (105) and Satellite B (120), respectively, to determine their relative location to one another (e.g., how far away is Satellite A (105) from Satellite B (120), or any overlapping coverage areas for Satellite A (105) and Satellite B (120)). The particular information for Transactions A and B can be obtained in order to determine the geographical information for the satellite. For example, the exemplary system, method and computer-accessible medium can determine the location and/or coverage area A (115) for Satellite A (105) on Date A at Time A, and compare it to the location and/or coverage area B (130) for Satellite B (125) on Date B at Time B. The exemplary system, method and computer-accessible medium can then determine the feasibility of the person associated with the financial account to have travelled from the location and/or Coverage Area A (115) associated with Satellite A (105) on Date A at Time A to the location and/or Coverage Area B (130) associated with Satellite B (120) on Date B at Time B. If it is determined that it is feasible for the person to have travelled this distance, then the transaction may not be determined to be fraudulent. However, if it is determined that it is not feasible, then the transaction may be determined to be fraudulent.

Various other factors can be used to determine whether or not a transaction is fraudulent. For example, the person associated with the financial account can put geographic restrictions in place, providing a boundary location in which the person intends to use the financial account. Thus, any transaction determined to be outside the boundary based on the location and/or geographic coverage area of a satellite, can be determined to be fraudulent. Conversely, the person can inform the financial institution of upcoming travel plans in order to limit a determination of fraudulent transactions based on the new location and/or geographic coverage area.

The exemplary system, method and computer-accessible medium, according to an exemplary embodiment of the present disclosure, can also analyze the transaction history of a financial account to use in determining whether or not a transaction is fraudulent. For example, the exemplary system, method and computer-accessible medium can monitor the transaction history for transactions associated with travel (e.g., plane tickets, train tickets, car rentals, etc.). The transaction information can include the travel plans associated with the transaction (e.g., the date and travel location for the purchased tickets). Thus, the person associated with the financial account may not need to inform the financial institution of the upcoming travel plans, as this information can be automatically determined by the exemplary system, method and computer-accessible medium. Based on the determined travel plans, the exemplary system, method and computer-accessible medium can utilize the destination information to aid in determining whether or not a transaction is fraudulent. For example, if a person purchased tickets in New York City to travel to Los Angeles on a particular date, then the exemplary system, method and computer-accessible medium can utilize this information to potentially not flag a transaction as fraudulent that took place in Los Angeles on or after that date. Additionally, the exemplary system, method and computer-accessible medium can flag a transaction as fraudulent that took place in New York City after the person has travelled to Los Angeles on the date of travel.

Figure 2:
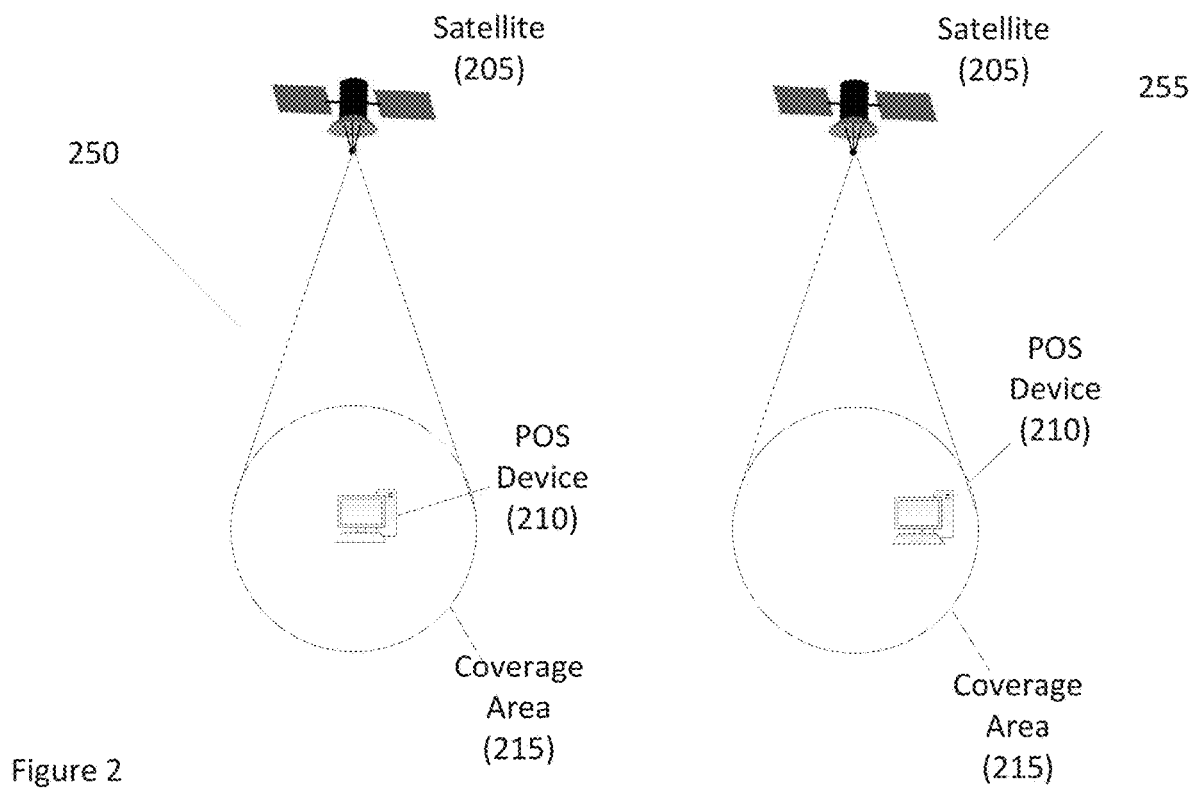
FIG. 2 is an exemplary diagram illustrating POS device position refinement based on the movement of a satellite and its associated geographic coverage area according to an exemplary embodiment of the present disclosure.
Figure 2:
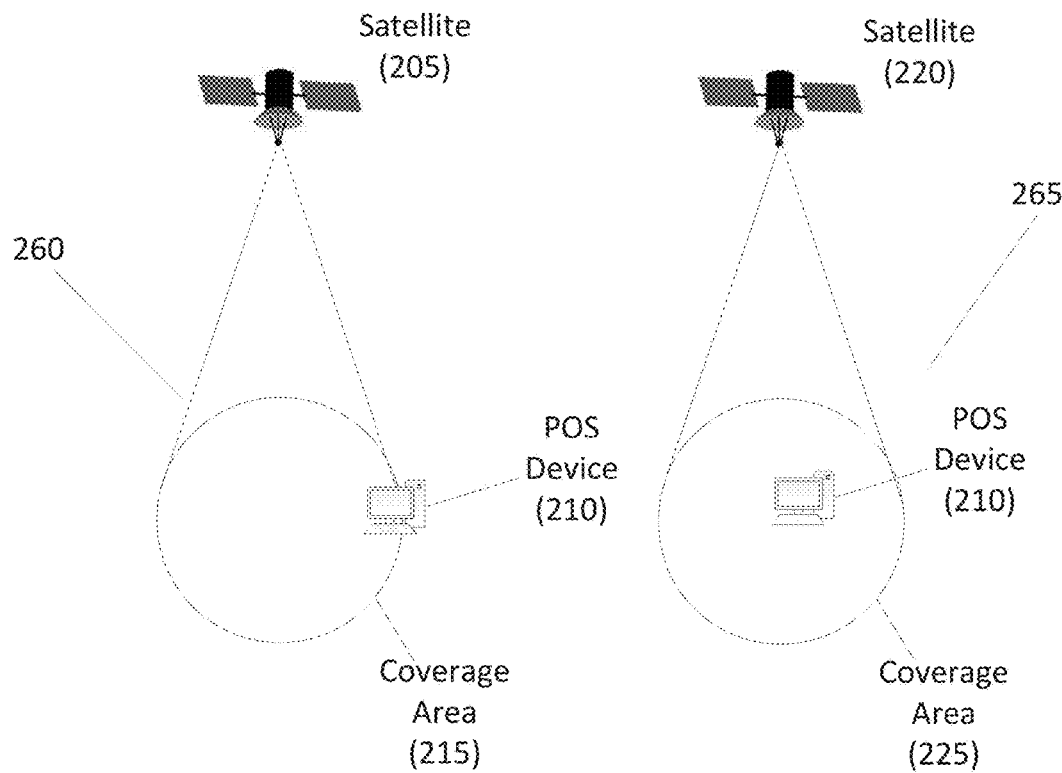

The exemplary system, method and computer-accessible medium, according to an exemplary embodiment of the present disclosure, can also utilize the movement of the satellite to improve the accuracy of the location in order to determine fraudulent transactions. FIG. 2 is an exemplary diagram illustrating POS device position refinement based on the movement of a satellite and its associated geographic coverage area according to an exemplary embodiment of the present disclosure. As shown in FIG. 2, at satellite position 250, when a POS Device 210 first connects to Satellite 205, it may not be possible to determine where exactly POS Device 210 is located within the Coverage Area 215. All that is known is that the POS Device 210 is located somewhere in Coverage Area 215. As Satellite 205 moves, if POS Device 210 is stationary, the exemplary system, method and computer-accessible medium can analyze the movement of Coverage Area 215 while POS Device 210 is still connected to Satellite 205. For example, position 255 shows POS Device 210 located in a different location within Coverage Area 215 associated with Satellite 205.

As long as POS Device 210 is connected to Satellite 205, as Satellite 205 is moving, the exemplary system, method and computer-accessible medium can narrow down the location of POS Device 210 as Coverage Area 215 of Satellite 205 when POS Device 210 first connects to Satellite 205 can be compared to the moving geographic coverage areas. As shown in position 260, POS Device 210 is located at the edge of Coverage Area 215. However, POS Device 210 is still connected to Satellite 205 as POS Device 210 is still within Coverage Area 215. However, at position 265, POS Device 210 is no longer in Coverage Area 215. POS Device 210 is now located in Coverage Area 225, which is associated with Satellite 220. The exemplary system, method and computer-accessible medium, according to an exemplary embodiment of the present disclosure, can utilize information regarding when POS Device 210 lost the connection with Satellite 205 since it left Coverage Area 215, and when POS Device 210 connected to Satellite 220 by entering Coverage Area 225, to determine a more accurate location for POS Device 210.

Figure 3:
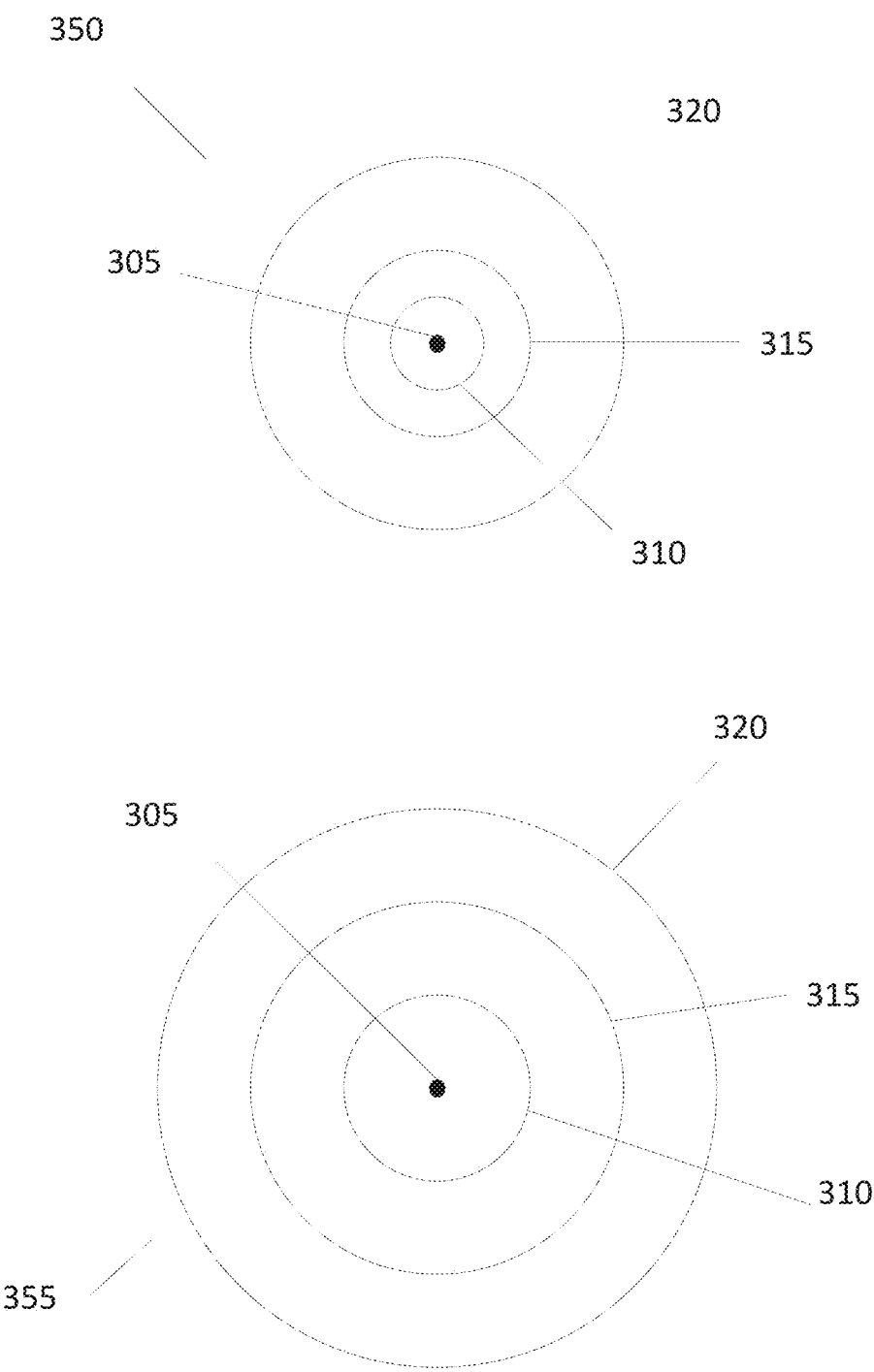
FIG. 3 is an exemplary diagram illustrating feasibility maps for different methods of travel according to an exemplary embodiment of the present disclosure.

FIG. 3 is an exemplary diagram illustrating different feasibility maps for methods of travel according to an exemplary embodiment of the present disclosure. The exemplary system, method and computer-accessible medium, according to an exemplary embodiment of the present disclosure, can generate multiple feasibility maps (e.g., maps 350 and 355 shown in FIG. 3), with a point 305 representing a POS device located within each map. Each feasibility map 350 and 355 can include a series of multiple concentric circles (e.g., circles 310, 315, and 320) around the POS Device. Each concentric circle can represent a method of travel (e.g., walking, running, biking, driving, riding the train, flying, etc.). For example, as shown in FIG. 3, Circle 310 can represent walking, Circle 315 can represent driving, and Circle 320 can represent train travel. Circles 310, 315, and 320, and point 305, can be overlaid over a geographical map, with point 305 being placed at the approximate location of the POS Device.

As shown in FIG. 3, the size of each circle can be constantly changing based on the time duration between each transaction (e.g., the size of Circles 310, 315, and 320 in Map 350 are smaller than the size of corresponding Circles 310, 315, and 320 in map 355). For example as shown in Map 350, once Transaction A occurs on Date A at Time A, Circles 310, 315, and 320 can be placed around the approximate location of the POS Device (e.g., point 305) where Transaction A occurs. Each of the circles will start to expand as the time from Time A increases (e.g., Map 355 represents a point in time later than Map 350). Thus, the size of each circle will be smaller after only 5 minutes than it will be after 5 hours. The exemplary system, method and computer-accessible medium can determine if Transaction B falls within one of the feasibility circles to determine whether or not a transaction is fraudulent. In particular, if a transaction falls within one of the circles, then the transaction may not be fraudulent. However, if the transaction is beyond the circle, then the transaction may be fraudulent. Each transaction can have its own set of maps, and the maps can be constantly updated.

The exemplary system, method and computer-accessible medium, according to an exemplary embodiment of the present disclosure, can also access multiple databases to determine real time travel information for use in generating the feasibility maps shown in FIG. 3. For example, the exemplary system, method and computer-accessible medium can perform an application programming interface ("API") call to a map database (e.g., Google Maps, Apple Maps, etc.), and determine or plot one or more routes between the location of one transaction and the next transaction. Then, a determination can be made as to whether a route exists that would facilitate the purchaser to travel from the location of the first purchase to the location of the second purchase. For example, the exemplary system, method and computer-accessible medium can plot a route based on the person walking, biking, driving, taking a train, and flying, to see if it was feasible for the person to have travelled between the locations of the transactions. Real-time traffic information can also be used, which can affect the travel time between the different locations.

Additionally, the exemplary system, method and computer-accessible medium can perform an API call to travel databases for travel schedules associated with trains and planes. For example, if a person is located in New York City, the exemplary system, method and computer-accessible medium can access the commuter rail schedules to determine not only if it were possible for the person to travel the distance between the locations of two transactions in the amount of time between transactions, but also if a train schedule would allow such travel to be made (e.g., was there a train scheduled to leave that would facilitate the person to make it to the next transaction in time). Additionally, flights schedules for one or more airlines can be obtained, including estimated departure and arrival time, as well as actual departure and arrival time, to determine if a flight existed that would facilitate the person to travel between the locations of the transaction in the time between transactions. The exemplary system, method and computer-accessible medium can also utilize information from multiple databases to determine if the travel was feasible. For example, the exemplary system, method and computer-accessible medium can access a local road map and real-time traffic information to calculate the time to travel from the location of the first transaction to local airport. Then, flight schedule, and actual departure and arrival times, can be obtained to determine travel between two far away locations. Then a local road maps and real-time traffic information can be obtained from the destination airport to the location of the second transaction. All of this information can be used to determine the feasibility of travel between the locations of two different transactions, which can be used to determine if a transaction is fraudulent.

The exemplary system, method and computer-accessible medium, according to an exemplary embodiment of the present disclosure, can also compare the geographic coverage area for a satellite associated with a transaction and compare it to the geographic coverage area for the satellite used by a device associated with the financial account. For example, the person associated with the financial account can link a network-enabled device with the financial account which can be used similar to a two-factor authentication. When a purchase is made, the exemplary system, method and computer-accessible medium can determine the satellite associated with this transaction, and the geographic coverage area as determined based on the above description. Then, the satellite associated with the network-enabled device, and its associated geographic coverage area, can be determined. If the geographic coverage area associated with the network-enabled device is sufficiently similar to the geographic coverage area associated with the transaction, then the transaction may not be fraudulent. However, if the geographic coverage area associated with the network-enabled device is sufficiently different from the geographic coverage area associated with the transaction, then the transaction may be determined to be fraudulent.

Figure 4:
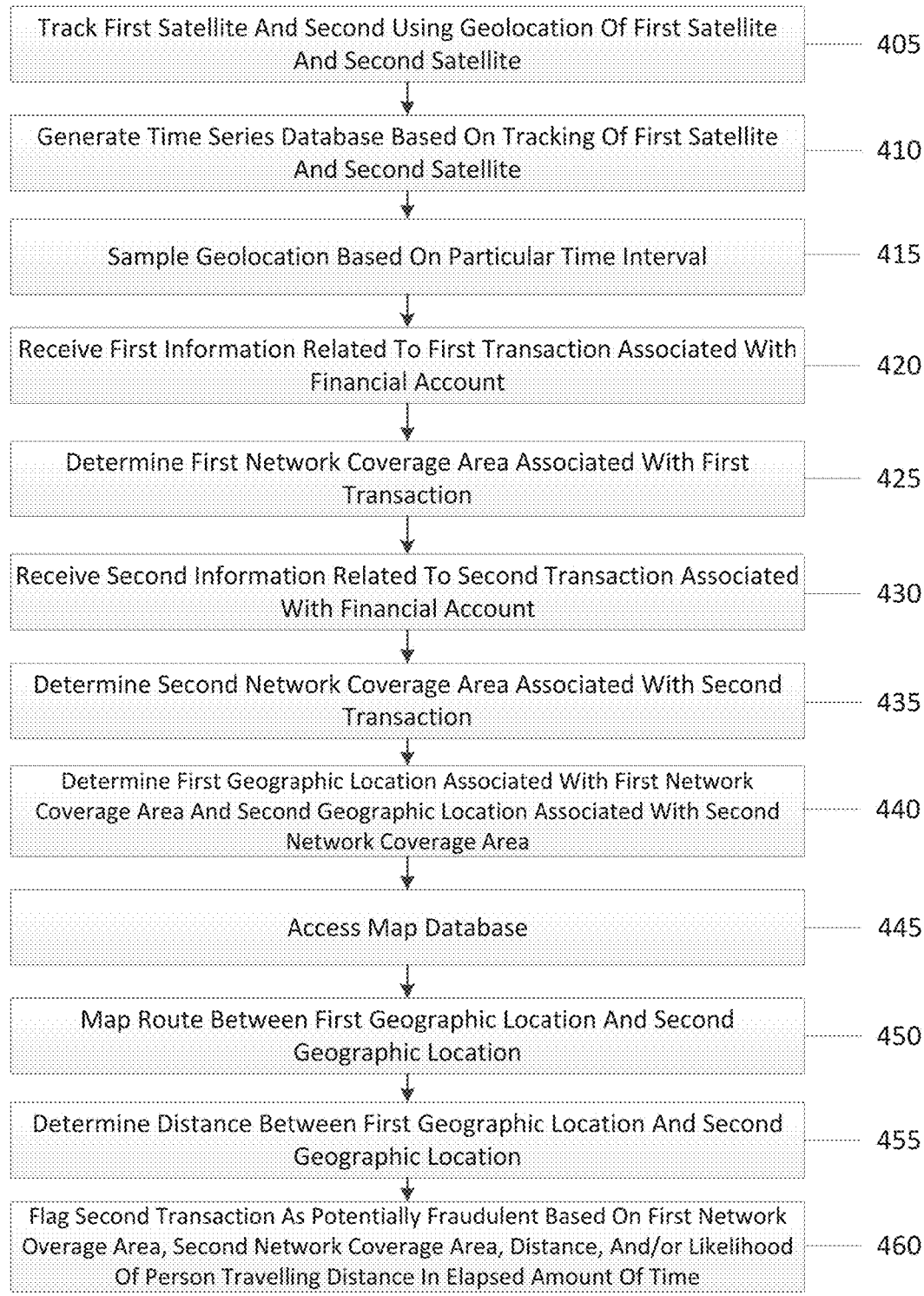
FIGS. 4-6 are flow diagrams of methods for determining data breaches according to an exemplary embodiment of the present disclosure.
Figure 5:
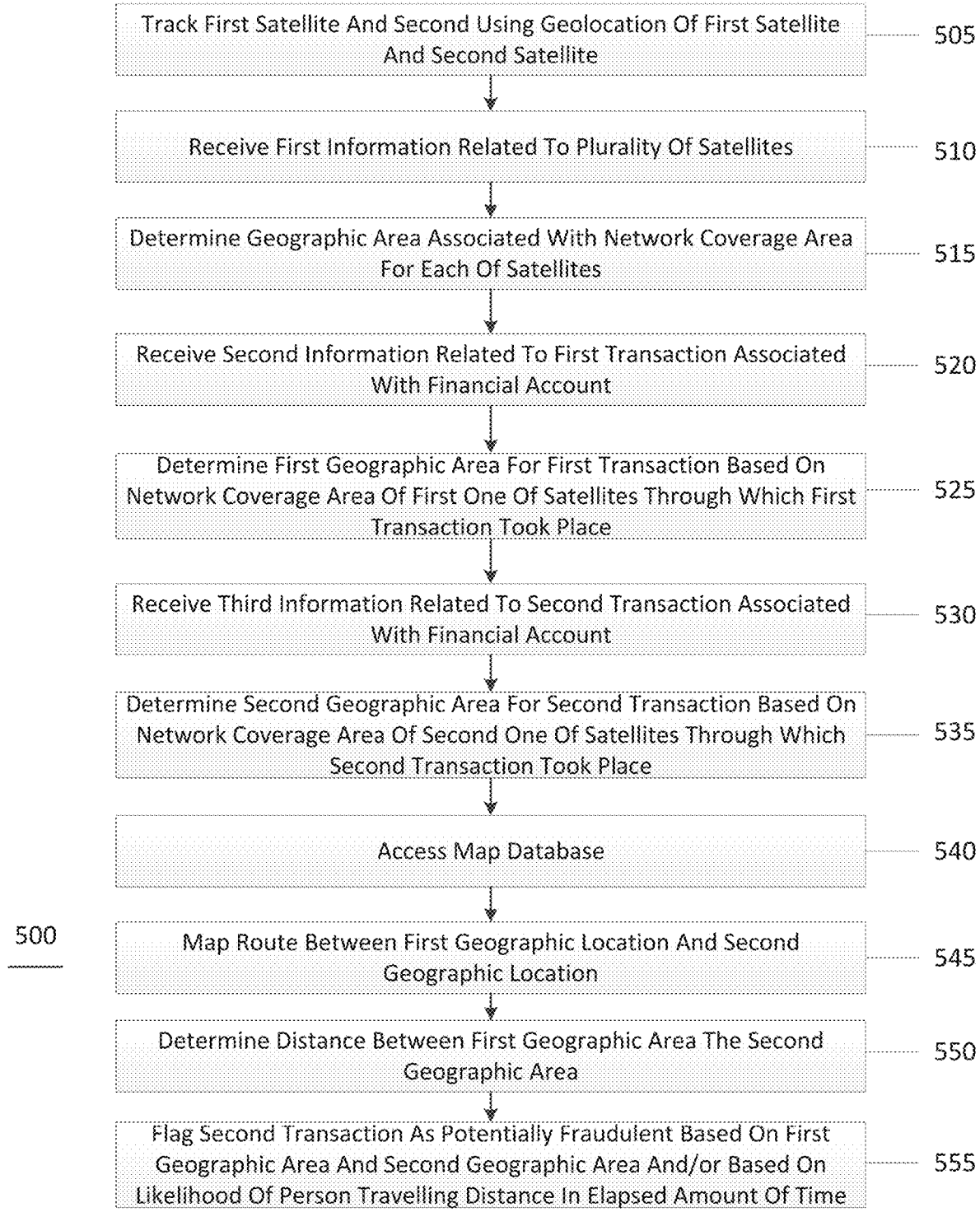
Figure 6:
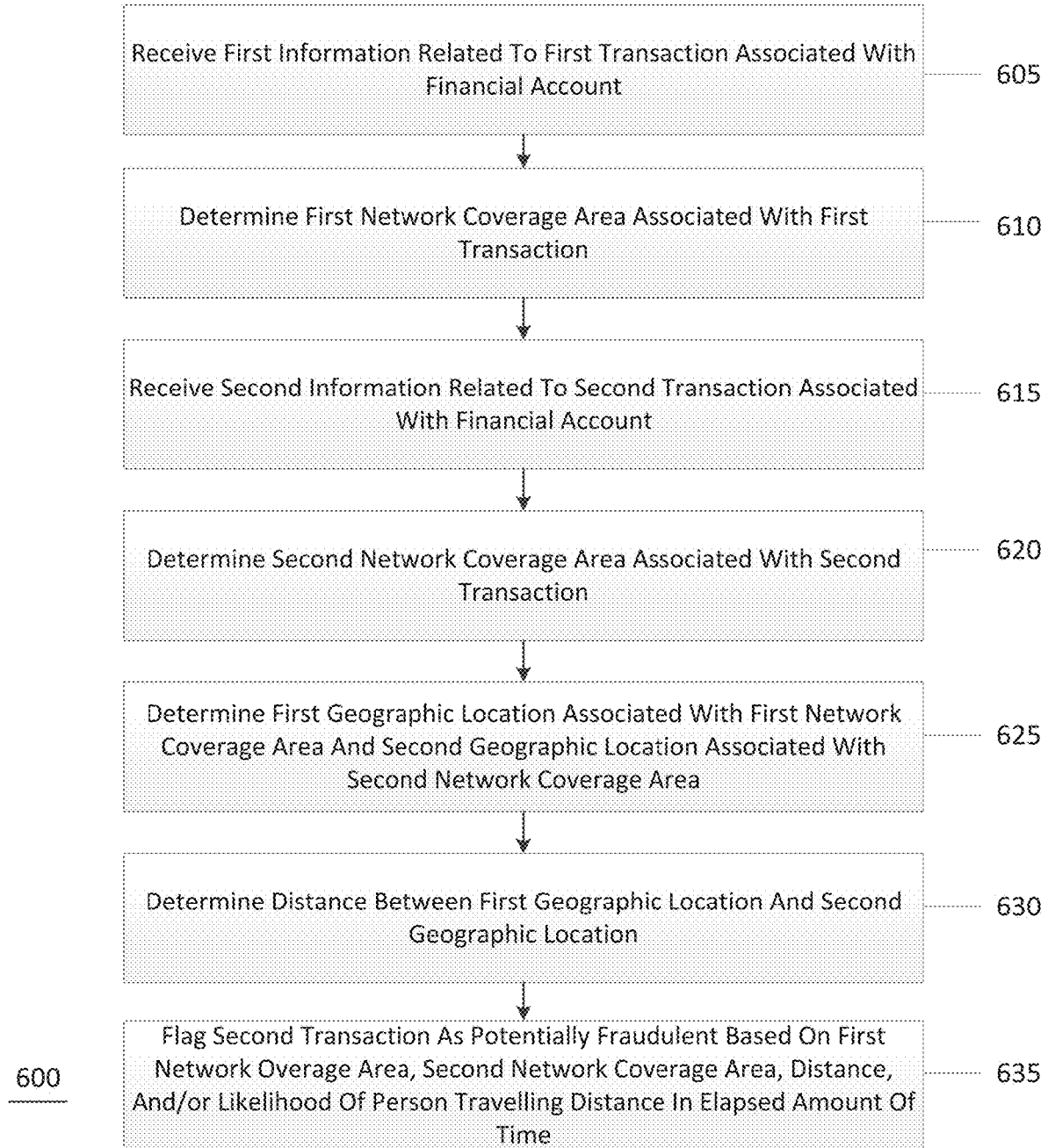

FIGS. 4, 5, and 6 are exemplary flow diagrams of exemplary methods 400, 500, and 600, respectively, for performing procedures according to an exemplary embodiment of the present disclosure.

For example, as shown in FIG. 4, at procedure 405, first and second satellites can be tracked using geolocations for the first and second satellites. At procedure 410, a time series database can be generated based on the tracking of the first and second satellites. At procedure 415, the geolocation can be sampled based on a particular time interval. At procedure 420, first information related to a first transaction associated with a financial account can be received. Information can include, but is not limited to, the amount of the transaction, the date and time of the transaction, and a network device over which the transaction took place. At procedure 425, a first network coverage area associated with the first transaction can be determined. The first network coverage area can be determined, for example, by accessing one or more databases that include information related to the network device. The database can include the coverage area for the network device, and the date and time at which the network device provided the coverage area. This information can include a time series at a particular interval. At procedure 430, second information related to a second transaction associated with the financial account can be received. Information can include, but is not limited to, the amount of the transaction, the date and time of the transaction, and a network device over which the transaction took place. At procedure 435, a second network coverage area associated with the second transaction can be determined. The second network coverage area can be determined, for example, by accessing one or more databases that include information related to the network device. The database can include the coverage area for the network device, and the date and time at which the network device provided the coverage area. This information can include a time series at a particular interval. At procedure 440, a first geographic location associated with the first network coverage area and a second geographic location associated with the second network coverage area can be determined. This can be determined, for example, based on the information contained within the database. At procedure 445, a map database can be accessed. At procedure 450, a route between the first geographic location and the second geographic location can be mapped. At procedure 455, a distance between the first geographic location and the second geographic location can be determined (e.g., based on the mapped route). This can be determined, for example, using map information, and can include information related to various methods of travel. At procedure 460, the second transaction can be flagged as potentially fraudulent based on the first network overage area, the second network coverage area, the distance, and/or the likelihood of a person travelling the distance in the elapsed amount of time. For example, if a person could not have travelled the distance in the elapsed amount of time, then the second transaction may be determined to be fraudulent. The information may also be used in another fraudulent procedure as one data point in a fraudulent determination.

As shown in FIG. 5, at procedure 505, first and second satellite can be tracked using a geolocation. At procedure 510, first information related to a plurality of satellites can be received. At procedure 515, a geographic area associated with a network coverage area for each of the satellites can be determined. The geographic area can be determined by accessing one or more databases containing information pertaining to the satellites. For example, the database can include the location and coverage area for the satellites over a particular amount of time. At procedure 520, second information related to a first transaction associated with a financial account can be received. Information can include, but is not limited to, the amount of the transaction, the date, and the time of the transaction. At procedure 525, a first geographic area for the first transaction can be determined based on the network coverage area of a first one of the satellites through which the first transaction took place. This can be determined, for example, by accessing the database with the information pertaining to the satellite. At procedure 530, third information related to a second transaction associated with the financial account can be received. Information can include, but is not limited to, the amount of the transaction, the date, and the time of the transaction. At procedure 535, a second geographic area for the second transaction can be determined based on the network coverage area of a second one of the satellites through which the second transaction took place. This can be determined, for example, by accessing the database with the information pertaining to the satellite. At procedure 540, a map database can be accessed. At procedure 545, a route between the first geographic location and a second geographic location can be mapped. At procedure 550, a distance between the first geographic area and the second geographic area can be determined (e.g., based on the mapped route). This can be determined, for example, using map information, and can include information related to various methods of travel. At procedure 555, the second transaction can be flagged as potentially fraudulent based on the first geographic area and the second geographic area and/or based on likelihood of a person travelling the distance in the elapsed amount of time. For example, if a person could not have travelled the distance in the elapsed amount of time, then the second transaction may be determined to be fraudulent. The information may also be used in another fraudulent procedure as one data point in a fraudulent determination.

As shown in FIG. 6, at procedure 605, first information related to a first transaction associated with a financial account can be received. Information can include, but is not limited to, the amount of the transaction, the date, and the time of the transaction. At procedure 610, a first geographic area associated with the first transaction can be determined based on a first network coverage area associated with a first satellite through which the first transaction took place. The first geographic area can be determined, for example, by accessing one or more databases that include information related to the first satellite. The database can include the coverage area for the first satellite, and the date and time at which the first satellite provided the coverage area. This information can include a time series at a particular interval. At procedure 615, second information related to a second transaction associated with the financial account can be received. Information can include, but is not limited to, the amount of the transaction, the date, and the time of the transaction. At procedure 620, a second geographic area associated with the second transaction can be determined based on a second network coverage area associated with a second satellite through which the second transaction took place. The second geographic area can be determined, for example, by accessing one or more databases that include information related to the second satellite. The database can include the coverage area for the second satellite, and the date and time at which the second satellite provided the coverage area. This information can include a time series at a particular interval. At procedure 625, an elapsed time between the first transaction and the second transaction can be determined and a distance between the first geographic area and the second geographic area can be determined. At procedure 630, a likelihood of a person travelling the distance in the elapsed amount of time can be determined. At procedure 635, the second transaction can be flagged as potentially fraudulent based on the likelihood. For example, if a person could not have travelled the distance in the elapsed amount of time, then the second transaction may be determined to be fraudulent. The information may also be used in another fraudulent procedure as one data point in a fraudulent determination.

Figure 7:
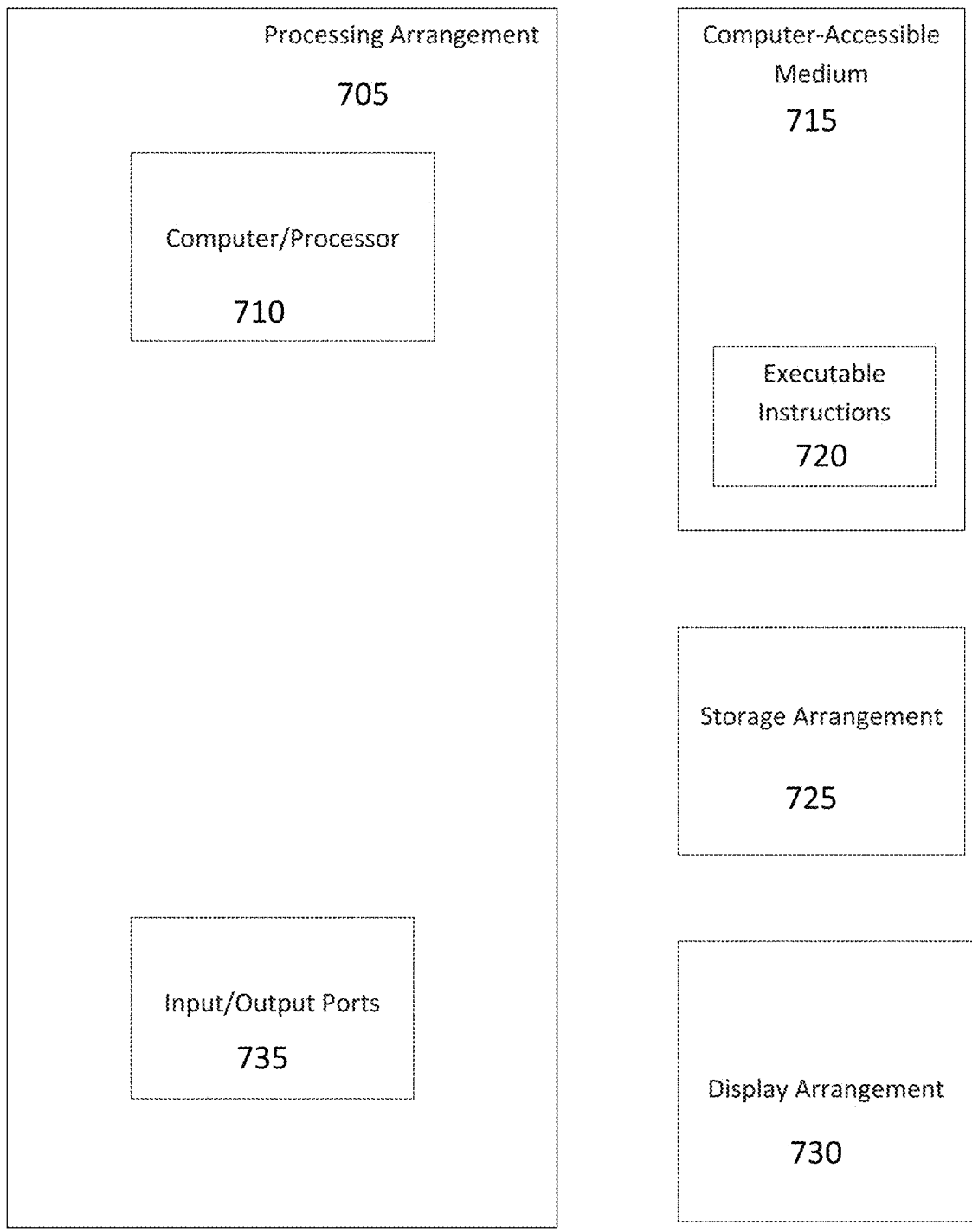
FIG. 7 is an illustration of an exemplary block diagram of an exemplary system in accordance with certain exemplary embodiments of the present disclosure.

FIG. 7 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 705. Such processing/computing arrangement 705 can be, for example entirely or a part of, or include, but not limited to, a computer/processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., as described herein above, a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 720 thereon. In addition or alternatively, a storage arrangement 725 can be provided separately from the computer-accessible medium 715, which can provide the instructions to the processing arrangement 705 so as to configure the processing arrangement to execute certain exemplary procedures, processes, and methods, as described herein above, for example.

Further, the exemplary processing arrangement 705 can be provided with or include an input/output ports 735, which can include, for example a wired network, a wireless network, the internet, an intranet, a data collection probe, a sensor, etc. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions, wherein, when a computer hardware arrangement comprising a microprocessor in data communication with a database containing information for a plurality of satellites executes the instructions, the computer arrangement is configured to perform procedures comprising:
receiving first information related to a first transaction associated with a financial account, wherein the first information includes a first date and a first time associated with the first transaction;
tracking a first satellite of the plurality of satellites and a second satellite of the plurality of satellites using a geolocation of the first satellite and a geolocation of the second satellite;
updating the database based on the tracking of the first satellite and the second satellite;
determining a first network coverage area associated with the first transaction based on the first information and by accessing the database, wherein the first network coverage area is based on a coverage area for the first satellite;
receiving second information related to a second transaction associated with the financial account, wherein the second information includes a second date and a second time associated with the second transaction;
determining a second network coverage area associated with the second transaction based on the second information and by accessing the database, the second network coverage area is based on a coverage area for the second satellite;
accessing a map database;
determining a first geographic location associated with the first network coverage area and a second geographic location associated with the second network coverage area;
mapping a route between the first geographic location and the second geographic location;
determining a distance based on the route;
generating one or more feasibility maps, wherein each feasibility map comprises one or more circles around the first geographic location, wherein:
each circle represents a method of a travel, and
the distance from each circle to the first geographic location represents a feasible distance that could be travelled over a period of time from the first geographic location; and
flagging the second transaction as potentially fraudulent based on the first network coverage area, the second network coverage area, an elapsed time between the first transaction and the second transaction, a likelihood of a person travelling the distance in the elapsed amount of time, and the distance between the first geographic location and the second geographic location on the one or more feasibility maps.

2. The computer accessible medium of claim 1, wherein the computer arrangement is configured to flag the second transaction if the first network coverage area and the second network coverage area do not overlap.

3. The computer accessible medium of claim 1, wherein the first satellite is different than the second satellite.

4. The computer-accessible medium of claim 1, wherein the computer arrangement is further configured to generate at least one time series database based on the tracking of the first satellite and the second satellite.

5. The computer arrangement of claim 1, wherein the computer arrangement is further configured to sample the geolocation based on a particular time interval.

6. The computer accessible medium of claim 1, wherein the likelihood is based on a method of travel.

7. A non-transitory computer-accessible medium having stored thereon computer-executable instructions, wherein, when a computer hardware arrangement comprising a microprocessor in data communication with a database containing historical satellite location information executes the instructions, the computer arrangement is configured to perform procedures comprising:
receiving first information related to a plurality of satellites;
accessing the database to obtain historical location information for the plurality of satellites;
tracking a first satellite of the plurality of satellites and a second satellite of the plurality of satellites using a geolocation of the first satellite and a geolocation of the second satellite;
updating the database based on the tracking of the first satellite and the second satellite;
determining a geographic area associated with a network coverage area for each of the satellites;
receiving second information related to a first transaction associated with a financial account, wherein the second information includes a first date and a first time associated with the first transaction;
determining a first geographic area for the first transaction based on the network coverage area of the first satellite and the second information;
receiving third information related to a second transaction associated with the financial account, wherein the third information includes a second date and a second time associated with the second transaction;
determining a second geographic area for the second transaction based on the network coverage area of the second satellite and the third information;
generating one or more feasibility maps, wherein each feasibility map comprises one or more circles around the first geographic location, wherein:
each circle represents a method of a travel, and
the distance from each circle to the first geographic location represents a feasible distance that could be travelled over a period of time from the first geographic location; and
flagging the second transaction as potentially fraudulent based on the first geographic area, the second geographic area, and the distance between the first geographic location and the second geographic location on the one or more feasibility maps.

8. The computer-accessible medium of claim 7, wherein the computer arrangement is configured to flag the second transaction if the first geographic area and the second geographic coverage area do not overlap.

9. The computer accessible medium of claim 7, wherein the computer arrangement is further configured to flag the second transaction based on an elapsed time between the first transaction and the second transaction.

10. The computer accessible medium of claim 9, wherein the computer arrangement is further configured to determine a distance between the first geographic area and the second geographic area.

11. The computer accessible medium of claim 10, wherein the computer arrangement is configured to flag the second transaction based on a likelihood of a person travelling the distance in the elapsed amount of time.

12. The computer accessible medium of claim 11, wherein the likelihood is based on a method of travel.

13. The computer accessible medium of claim 12, wherein computer arrangement is further configured to:
access at least one map database;
map a route between the first geographic location and the second geographic location; and
determine the distance based on the route.

14. The computer-accessible medium of claim 7, wherein the second transaction is flagged as potentially fraudulent based on the first geographic area, the second geographic area, and a geographic restriction.

15. The computer-accessible medium of claim 14, wherein:
the geographic restriction is associated with a user associated with the financial account, and
the geographic restriction comprises a boundary for use of the financial account.

16. The computer-accessible medium of claim 7, wherein:
the third information further includes a travel location associated with the second transaction, and
the second transaction is flagged as potentially fraudulent based on the first geographic area, the second geographic area, and the travel location.

17. A non-transitory computer-accessible medium having stored thereon computer-executable instructions, wherein, when a computer hardware arrangement comprising a microprocessor in data communication with a database containing historical location information for a plurality of satellites executes the instructions, the computer arrangement is configured to perform procedures comprising:
receiving first information related to a first transaction associated with a financial account;
accessing the database to obtain historical location information for a first satellite and a second satellite;
tracking the first satellite and the second satellite using a geolocation of the first satellite and a geolocation of the second satellite;
updating the database based on the tracking of the first satellite and the second satellite;
determining a first geographic area associated with the first transaction based on a first network coverage area associated with the first satellite;
receiving second information related to a second transaction associated with the financial account;
determining a second geographic area associated with the second transaction based on a second network coverage area associated with the second satellite;
generating one or more feasibility maps, wherein each feasibility map comprises one or more circles around the first geographic location, wherein:
each circle represents a method of a travel, and
the distance from each circle to the first geographic location represents a feasible distance that could be travelled over a period of time from the first geographic location;
determining the distance between the first geographic location and the second geographic location on the one or more feasibility maps;
determining (i) an elapsed time between the first transaction and the second transaction and (ii) a distance between the first geographic area and the second geographic area;
determining a likelihood of a person travelling the distance in the elapsed amount of time; and
flagging the second transaction as potentially fraudulent based on the likelihood.

18. The computer-accessible medium of claim 17, wherein tracking the first satellite and the second satellite comprises:
calculating a rate of change of the first satellite and the second satellite,
calculating a sampling interval, and
tracking the first satellite and the second satellite based on the sampling interval.

19. The computer-accessible medium of claim 18, wherein tracking the first satellite and the second satellite further comprises periodically updating the sampling interval.

20. The computer-accessible medium of claim 17, wherein tracking the first satellite and the second satellite comprises determining information pertaining to a current location, a direction of travel, and a speed of travel for the first satellite and the second satellite.

* * * * *